US012777440B2

(12) United States Patent
Atungsiri et al.

(10) Patent No.: US 12,777,440 B2
(45) Date of Patent: Oct. 27, 2026

(54) ELECTRONIC DEVICE, INFRASTRUCTURE EQUIPMENT AND METHOD

(71) Applicant: Sony Group Corporation, Tokyo (JP)

(72) Inventors: Samuel Asangbeng Atungsiri, Basingstoke (GB); Vivek Sharma, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 435 days.

(21) Appl. No.: 18/018,603

(22) PCT Filed: Aug. 4, 2021

(86) PCT No.: PCT/EP2021/071748
§ 371 (c)(1),
(2) Date: Jan. 30, 2023

(87) PCT Pub. No.: WO2022/029167
PCT Pub. Date: Feb. 10, 2022

(65) Prior Publication Data
US 2023/0300768 A1 Sep. 21, 2023

(30) Foreign Application Priority Data
Aug. 6, 2020 (EP) .................................... 20189882

(51) Int. Cl.
*H04W 56/00* (2009.01)
*H04W 84/06* (2009.01)

(52) U.S. Cl.
CPC ........ *H04W 56/0045* (2013.01); *H04W 84/06* (2013.01)

(58) Field of Classification Search
CPC .......... H04B 7/18563; H04W 56/0045; H04W 84/06
See application file for complete search history.

(56) References Cited

U.S. PATENT DOCUMENTS

| | | | | |
|---|---|---|---|---|
| 12,177,806 | B2 * | 12/2024 | Wiacek | H04W 56/001 |
| 2013/0242952 | A1 | 9/2013 | Chu | |

(Continued)

FOREIGN PATENT DOCUMENTS

| | | | | |
|---|---|---|---|---|
| CN | 110476387 A | | 11/2019 | |
| CN | 112075118 A | * | 12/2020 | H04W 74/085 |
| WO | WO-2020221127 A1 | * | 11/2020 | H04W 56/0045 |

OTHER PUBLICATIONS

International Search Report and Written Opinion mailed on Dec. 3, 2021, received for PCT Application PCT/EP2021/071748, filed on Aug. 4, 2021, 10 pages.

3GPP, "3rd Generation Partnership Project; Technical Specification Group Radio Access Network; Solutions for NR to support non-terrestrial networks (NTN) (Release 16)", 3GPP TR 38.821 V1.0.0, Dec. 2019, pp. 1-143.

(Continued)

*Primary Examiner* — Shah M Rahman
(74) *Attorney, Agent, or Firm* — XSENSUS LLP

(57) ABSTRACT

An electronic device (UE) comprising circuitry configured to compensate feeder link influence on the common TA ($T_{com}$) in a transparent payload non-terrestrial network (NTN) configuration with a non-terrestrial network component (NT-RN) and an infrastructure equipment (gNB) tethered by the non-terrestrial network component (NT-RN).

14 Claims, 12 Drawing Sheets

(56) References Cited

U.S. PATENT DOCUMENTS

| | | | | |
|---|---|---|---|---|
| 2015/0052360 | A1* | 2/2015 | Ravishankar | H04L 63/0428 713/171 |
| 2020/0404713 | A1* | 12/2020 | Sakhnini | H04W 56/0045 |
| 2021/0029658 | A1* | 1/2021 | Mahalingam | H04W 56/0005 |
| 2021/0136641 | A1* | 5/2021 | Roy | H04B 7/1853 |
| 2021/0352606 | A1* | 11/2021 | Hosseinian | H04B 7/1851 |
| 2022/0039044 | A1* | 2/2022 | Wu | H04W 48/12 |
| 2022/0217600 | A1* | 7/2022 | Zhou | H04W 72/0446 |
| 2022/0264497 | A1* | 8/2022 | Wiacek | H04W 56/005 |
| 2022/0295434 | A1* | 9/2022 | Wang | H04W 36/0058 |
| 2022/0393957 | A1* | 12/2022 | Wang | H04W 56/0045 |
| 2023/0049008 | A1* | 2/2023 | Nishio | H04W 56/0045 |
| 2023/0254795 | A1* | 8/2023 | Ryu | H04W 72/21 370/350 |
| 2023/0344508 | A1* | 10/2023 | Tseng | H04W 56/005 |
| 2024/0292468 | A1* | 8/2024 | Xu | H04W 56/0045 |

OTHER PUBLICATIONS

ETRI, “Remaining issues on random access procedures in NTN”, 3GPP TSG-RAN WG2 Meeting #108, R2-1916036, Nov. 18-22, 2019, 3 pages.

Panasonic, “Timing advance and PRACH design for NTN”, 3GPP TSG RAN WG1 #99, R1-1912903, Nov. 18-22, 2019, 13 pages.

3GPP, “3rd Generation Partnership Project; Technical Specification Group Radio Access Network; Study on New Radio (NR) to support non-terrestrial networks (Release 15)”, 3GPP TR 38.811 V15.3.0, Jul. 2020, pp. 1-126.

3GPP, “3rd Generation Partnership Project; Technical Specification Group Radio Access Network; Solutions for NR to support non-terrestrial networks (NTN) (Release 16)”, 3GPP TR 38.821 V16.0.0, Dec. 2019, pp. 1-140.

* cited by examiner

ELECTRONIC DEVICE, INFRASTRUCTURE EQUIPMENT AND METHOD

CROSS-REFERENCE TO RELATED APPLICATIONS

This application is based on PCT filing PCT/EP2021/071748, filed on Aug. 4, 2021, which claims priority of European Patent Application No. 20189882.2, filed on Aug. 6, 2020, the contents of each are hereby incorporated by reference.

TECHNICAL FIELD

The present disclosure generally pertains to entities and user equipment of a mobile telecommunication system, in particular to Non-Terrestrial Networks (NTN).

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G") which provides capabilities as defined in the International Mobile Telecommunications-Advanced Standard (IMT-Advanced Standard), and the current fifth generation ("5G") which provides a new air interface called New Radio Access Technology Systems (NR). The 5G technology is based on 4G technology such as LTE which is standardized under the control of 3GPP ("3rd Generation Partnership Project"). There exists a successor LTE-A (LTE Advanced) allowing higher data rates than the basic LTE which is also standardized under the control of 3GPP. LTE was based on previous generations of mobile communications technologies such as GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

As the 5G system is based on LTE or LTE-A, respectively, specific requirements of the 5G technologies are dealt with by features and methods which are already defined in the LTE and LTE-A standard documentation.

Current technical areas of interest in 5G technology are known as the "Internet of Things", or IoT for short, and "Machine to Machine Communication" (M2M), or "Machine Type Communication" (MTC). 3GPP is developing technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

The technical report "Study on New Radio (NR) to support non-terrestrial networks", 3GPP TR 38.811 V15.3.0 (2020-July) relates to Non-Terrestrial Network (NTN) components of a 5G system. Non-Terrestrial Network components in the 5G system rely on space/airborne vehicles such as satellites to provide 5G service in un-served areas (isolated/remote areas, on board aircrafts or ships, high speed trains, etc.) that cannot be covered by terrestrial 5G network and underserved areas (e.g. sub-urban/rural areas). Non-Terrestrial Networks (NTN) also reinforce the 5G service reliability by providing service continuity for M2M/IoT devices or ensuring service availability anywhere especially for critical communications, future railway/maritime/aeronautical communications, and to enable 5G network scalability by providing efficient multicast/broadcast resources for data delivery towards the network edges or even user terminal. A role for Non-Terrestrial Network components in the 5G system is expected in the fields of transport, public safety, media and entertainment, eHealth, energy, agriculture, finance, and automotive.

Typically, in mobile communication networks such as 3G, 4G, and 5G, the time at which a User Equipment (e.g. phone) is allowed to transmit traffic within a timeslot is adjusted according to the distance between the UE and the base station (eNodeB, gNB) to cope with transmission delays and to prevent interference with adjacent users. Timing Advance (TA) is the variable controlling this adjustment. In general, timing advance (TA) is the time that the UE has to advance its transmissions by so that the transmission arrives at the base station at the appropriate time in the uplink subframe the start of which is aligned to the downlink subframe. This offset at the UE is necessary to ensure that the downlink and uplink subframes are synchronised at the base station (gNB). The base station (gNB) continuously measures timing of uplink signals from each UE and adjusts the uplink transmission timing by sending the value of Timing Advance (TA) to the respective UE. As long as a UE sends some uplink data or signal (PUSCH/PUCCH/SRS), the gNB can estimate the uplink signal arrival time which can then be used to calculate the required Timing Advance value.

As the beam footprint sizes of Non-Terrestrial Networks NTN components are bigger than normal terrestrial cells, it is expected that TAs will be larger than the typical TAs in a terrestrial network wherein cell sizes are a lot smaller. The technical specification "Solutions for NR to support nonterrestrial networks (NTN)", 3GPP TR 38.821 V16.0.0 (2019-December), describes in section 6.3 the Uplink timing advance/RACH procedure, and, addresses in section 6.3.4 the aspect of maintenance for UL timing advance and synchronization in such NTN cells, introducing a common TA that is determined with respect to a common reference point defined by the non-terrestrial network entity, and UE-specific TAs. However, improvements in the technology of maintenance for UL timing advance and synchronization when Non-Terrestrial Networks NTN components are involved are needed.

SUMMARY

According to a first aspect, the disclosure provides an electronic device comprising circuitry configured to compensate feeder link influence on the common TA in a transparent payload non-terrestrial network configuration with a non-terrestrial network component and an infrastructure equipment tethered by the non-terrestrial network component.

According to a further aspect, the disclosure provides a method an infrastructure equipment comprising circuitry configured to provide information to a user equipment for compensating feeder link influence on the common TA in a transparent payload non-terrestrial network configuration with a non-terrestrial network component and a base station tethered by the non-terrestrial network component.

According to a further aspect, the disclosure provides a method comprising compensating feeder link influence on the common TA in a transparent payload non-terrestrial network configuration with a non-terrestrial network component and an infrastructure equipment tethered by the non-terrestrial network component.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
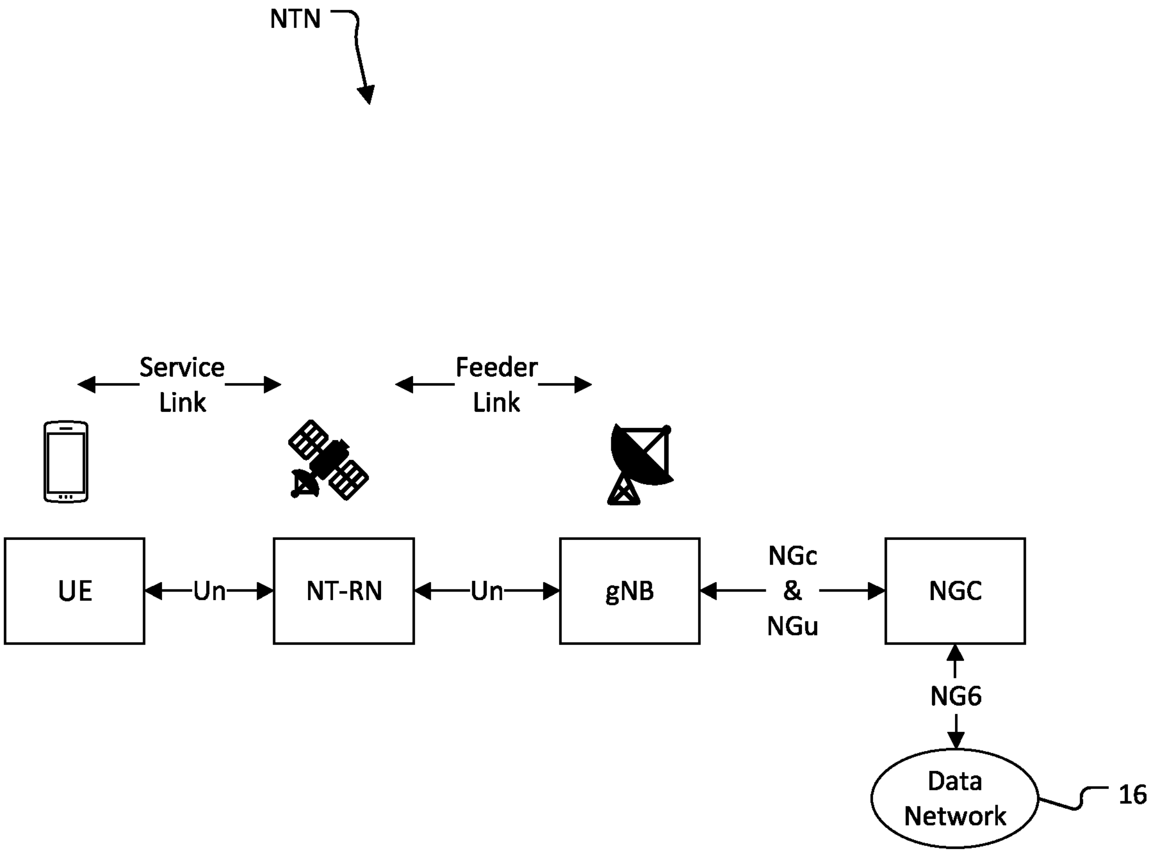
FIG. 1 shows a Non-Terrestrial Network (NTN) in which a space/aerial vehicle relays an NR signal between a gNB and a UE in a transparent manner.

Before a detailed description of the embodiments under reference of FIG. 1, some general explanations are made.

The embodiments described below disclose an electronic device comprising circuitry configured to compensate feeder link influence on the common TA in a transparent payload non-terrestrial network configuration with a non-terrestrial network component and an infrastructure equipment tethered by the non-terrestrial network component.

The electronic device may be a User Equipment. A User Equipment (UE) may be any device that is related to an end-user or to a terminal to communicate in e.g. a Universal Mobile Telecommunications System (UMTS) and 3GPP Long Term Evolution (LTE, or aLTE) system. The UE may support the New Radio Access Technology Systems in addition to the legacy system such as LTE, and other advancements. The User Equipment (UE) may also be a machine type communication (MTC) terminal. The UE may also have a relay function in which it forwards transmissions from other tethered UEs towards the network.

Circuitry of the electronic device may include at least one of: a processor, a microprocessor, a dedicated circuit, a memory, a storage, a radio interface, a wireless interface, a network interface, or the like, e.g. typical electronic components which are included in a User Equipment, such as a mobile phone.

The User Equipment (UE) may also be an aerial UE. An aerial UE may for example be a UE that is provided in, on or at an aerial vehicle. An aerial device may for example be an Unmanned Aerial Vehicles (UAV) (a "Drone"), or aircrafts that operate with various degrees of autonomy, e.g. under remote control by a human operator or autonomously by an onboard micro controller. An aerial UE may be a mobile communications device that is configured to communicate data via the transmission and reception of signals representing data using a wireless access interface. In the context of this application, the term aerial UE is also used for an electronic device that is autonomously or semi-autonomously operating in an aerial device, without the operator (or "user") of the device being required to be located at or close to the device. The term User Equipment (UE) thus also relates to equipment where the user is located remote to the equipment.

The circuitry of the electronic device may be configured to absorb changes in a feeder link propagation time as part of a UE-specific differential TA.

The circuitry of the electronic device may be configured to repeatedly adjust a UE-specific differential TA to take account of a changing distance between the non-terrestrial network component and the infrastructure equipment.

The circuitry of the electronic device may be configured to receive information on the ephemeris of the non-terrestrial network component and a location of the infrastructure equipment, and to repeatedly calculate a distance between the non-terrestrial network component and the infrastructure equipment based on this information.

The circuitry of the electronic device may be configured to receive information on the ephemeris of the non-terrestrial network component and an initial distance between the infrastructure equipment and the non-terrestrial network component, and to repeatedly calculate a distance between the nonterrestrial network component and the infrastructure equipment based on this information.

The circuitry of the electronic device may be configured to receive information on the location of the infrastructure equipment or information on the distance of the infrastructure equipment from the non-terrestrial network component once the electronic device enters RRC connected mode and/or shortly after feeder link switching occurs.

The circuitry of the electronic device may be configured to receive information on the location of the infrastructure equipment or information on the distance of the infrastructure equipment from the non-terrestrial network component in encrypted form.

The circuitry of the electronic device may be configured to repeatedly receive a current TA adjustment and to adjust a common TA according to this TA adjustment.

The circuitry of the electronic device may be configured to repeatedly determine a current TA adjustment according to a TA drift figure and its direction and to adjust a common TA according to this TA adjustment.

The TA drift figure and its direction may include both the drift due to the satellite movement in its orbit and also its changing displacement from the tethered infrastructure equipment.

The circuitry of the electronic device may be configured to receive the TA drift figure and its direction as part of the RAR response in msg2 of 4-step RACH or msgB of 2-step RACH or by regular MAC messages.

The embodiments further disclose a system comprising an electronic device as defined in claim 1, an infrastructure equipment located on the ground, and a non-terrestrial network component configured to relay uplink and downlink traffic between the user equipment and the infrastructure equipment.

The embodiments further disclose an infrastructure equipment comprising circuitry configured to provide information to a user equipment for compensating feeder link influence on the common TA in a transparent payload non-terrestrial network configuration with a non-terrestrial network component and a base station tethered by the non-terrestrial network component.

The infrastructure equipment may also be referred to as a base station, a network element such as an entity of a core network, an enhanced Node B or a coordinating entity for example, and may provide a wireless access interface to one or more communications devices within a coverage area or cell. The infrastructure equipment may for example be any entity of a telecommunications system, e.g. an entity of a New Radio Access Technology Systems, e.g. next Generation' Node B.

Circuitry of an infrastructure equipment may include at least one of: a processor, a microprocessor, a dedicated circuit, a memory, a storage, a radio interface, a wireless interface, a network interface, or the like, e.g. typical electronic components which are included in a base station, such as an gNB.

The circuitry of the infrastructure equipment may be configured to send to the user equipment information on the ephemeris of the non-terrestrial network component.

The circuitry of the infrastructure equipment may be configured to send to the user equipment information on the location of the infrastructure equipment tethered by the non-terrestrial network component.

The circuitry of the infrastructure equipment may be configured to send to the user equipment information on an initial distance between the infrastructure equipment and the non-terrestrial network component.

The circuitry of the infrastructure equipment may be configured to send to the user equipment information on the location of the infrastructure equipment or information on the distance of the infrastructure equipment from the non-terrestrial network component once the electronic device enters RRC connected mode and/or shortly after feeder link switching occurs.

The circuitry of the infrastructure equipment may be configured to send to the user equipment information on the location of the infrastructure equipment or information on the distance of the infrastructure equipment from the non-terrestrial network component in encrypted form.

The circuitry of the infrastructure equipment may be configured to repeatedly send to the user equipment a current TA adjustment.

The circuitry of the infrastructure equipment may be configured to send to the user equipment a TA drift figure and its direction.

The circuitry of the infrastructure equipment may be configured to send the TA drift figure and its direction ($\Delta T_{com}/\Delta t$) as part of the RAR response in msg2 of 4-step RACH or msgB of 2-step RACH or by regular MAC messages.

The embodiments also disclose a method comprising compensating feeder link influence on the common TA in a transparent payload non-terrestrial network configuration with a non-terrestrial network component and an infrastructure equipment tethered by the non-terrestrial network component. The method may be a computer-implemented method.

The embodiments also disclose a computer program comprising instructions, which when executed by a processor, instruct the processor to compensate feeder link influence on the common TA in a transparent payload non-terrestrial network configuration with a non-terrestrial network component and an infrastructure equipment tethered by the non-terrestrial network component. The embodiments also disclose a computer-readable medium storing this computer program.

The embodiments are now described in more detail with reference to the accompanying drawings.

As stated in the introductory part of this application, Non-Terrestrial Network (NTN) components in the 5G system rely on space/airborne vehicles (such as satellites) to provide 5G service in unserved or underserved areas that cannot be (sufficiently) covered by terrestrial 5G network. The purpose of a space/airborne network component is to provide the 5G service enablers to user equipment (UE) such as handheld devices.

For such space/airborne networks, it is considered a configuration where base station functions (next Generation Node B, short gNB) are on board the space/airborne vehicle. This scenario is called "regenerative payload NTN". There are other scenarios, where the space/airborne vehicle only relays an NR signal between a gNB and a UE in a transparent manner. In this latter scenario, which (also called "transparent payload", or "bent pipe payload"), there are no base station functions on board the space/airborne vehicle.

In general, the term "feeder link" refers to the radio link between the space/airborne platform and the gateways that connect the satellite or aerial access network to the core network, and the term "service link" refers to the radio link between the user equipment (UE) and the space/airborne platform. In addition to the service link to the space/airborne platform, the UE may also support a radio link with a terrestrial based RAN.

FIG. 1 shows a Non-Terrestrial Network (NTN) in which a space/aerial vehicle relays an NR signal between a gNB and a UE in a transparent manner. A non-terrestrial network device NT-RN (e.g. space/aerial vehicle such as a satellite) includes functionality to relay, via a Un interface, an NR signal between a UE and a terrestrial next Generation Node B gNB. The gNB communicates with NG Core components NGC, in particular a core data network. Here, the gNB comprises the functionality of an NTN Gateway which acts as router interfacing the NGC. Via the non-terrestrial network device NT-RN, the gNB provides NR user plane and control plane protocol terminations towards the UE, and connects via the NG interface to the NG Core (NGC).

Here, the Un interface refers to the radio interface between the UE and the gNB via the non-terrestrial network device NT-RN. Still further, NGc refers to the control plane interface between the gNB and the NGC and NGu refers to the user plane interface between the gNB and the NGC.

Transparent Mode NTN Configuration

In a transparent mode NTN configuration such as described in FIG. 1, the space/airborne network component (e.g. satellite) is transparent to the UE and the one way propagation delay from the UE to the gNB incorporates the feeder link which connects the satellite to the terrestrial gNB. As the length of this feeder link changes due to satellite orbital movement and occasional feeder link switching, this needs to be reflected in the timing adjustments between the UE and the gNB.

Figure 2:
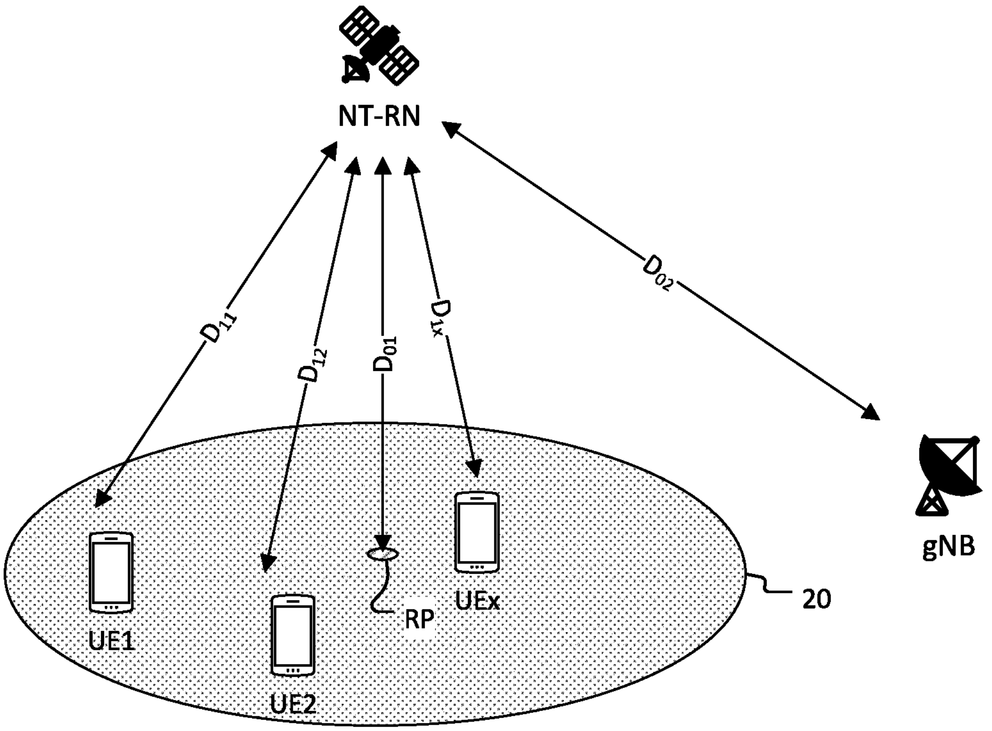
FIG. 2 schematically illustrates an embodiment of uplink (UL) time synchronization in a transparent payload NTN scenario.

FIG. 2 schematically illustrates an embodiment of uplink (UL) time synchronization in a transparent payload NTN scenario. A terrestrial gNB provides NR user plane and control plane protocol terminations towards user equipments UE1, UE2, . . . , UEx via a non-terrestrial (space/airborne) network component (e.g. a satellite) NT-RN. The non-terrestrial network component NT-RN acts as non-terrestrial relay node NT-RN and relays the uplink and downlink signals from and to gNB for user equipments UEs UE1, UE2, . . . , UEx within its service area 20 (footprint of the spot beam of the space/airborne network component NT-RN). To this end, the space/airborne network component NT-RN connects via the NG interface to the gNB.

The network NGC which knows the ephemeris of the non-terrestrial network component (satellite) NT-RN and the location of the gNB calculates a common timing adjustment (TA) that all UEs within the given service area 20 can use to advance their UL transmissions so that at the gNB, there can be alignment of all UL received and DL transmit frames.

A common timing adjustment (common TA) $T_{com}$ is defined as the delay between the gNB and a reference point RP defined in the beam footprint 20:

$$T_{com}=2^{*}(D_{01}+D_{02})/c$$

where $D_{01}$ is the distance between the reference point RP and the space/airborne relay node NT-RN, $D_{02}$ is the distance between the space/airborne network relay node NT-RN and the gNB, and c is the speed of light. This common TA $T_{com}$ may be seen as the average delay between the gNB and all locations of UEs within the footprint 20 of the spot beam.

The reference point RP may for example be taken as the center of the beam footprint 20 on the earth surface. In particular, the common TA reference point may for example be defined as the earth-based center of the beam footprint when the satellite is at zenith. This can be calculated by the network as it knows the ephemeris of the satellite and in general the beam footprint. If the reference point is on earth, then any UEs that happens to be airborne (e.g. the UE of a passenger on a plane) will be in general closer to the space/airborne network component than the common TA reference point. For such UEs, their UE specific differential TA will be negative. In order to ensure that differential TAs for all UEs, including airborne UEs, is always positive, the reference point RP may be defined at an aerial location above the beam center on earth. The height of such a location may for example be the predetermined maximum height at which it is known a UE can potentially rise to, e.g. the highest height aircraft can fly to (for example 15000 km above sea level).

There are several ways to determine the common TA $T_{com}$. For example, the network may calculate the common TA and broadcast it within the beam for example, in system information. Alternatively, in connected mode, the network may send the UE the common TA via a MAC signaling like e.g. MAC CE message. Still further, knowing the common TA reference point of its beam and the current position of the satellite (through knowledge of the ephemeris), the UE can itself calculate the common TA. If the UE has to calculate the common TA, then the location of the common TA reference point may be broadcast to the UE (respectively all UEs in the beam footprint) for example through system information so that the UE knows the reference point for computing the common TA. The ephemeris data may be provided to the UEs according to the principles set out in section 7.3.6.2 of 3GPP TR 38.821 V16.0.0 which are summarized below with regard to FIG. 8 and the corresponding description.

Each UE is supposed to derive a UE-specific differential delay adjustment $T_{UEx}$ (for the x-th UE) which is related to the propagation time between the x-th UE and the reference point for the common TA:

$$T_{UEx}=2^{*}(D_{1x}-D_{01})/c$$

where $D_{01}$ is the distance between the reference point RP and the gNB, $D_{1x}$ is the distance between gNB and the x-th UE, and c is the speed of light. As the beam footprint sizes of NTN components are bigger than normal terrestrial cells, it is expected that even this UE specific differential TA will be larger than the typical TAs in a terrestrial network wherein cell sizes are a lot smaller. A positioning capable UE, knowing its position and the reference point RP for the common TA can calculate its differential delay $T_{UEx}$ as the propagation time to the common TA reference point. Alternatively, the network, knowing the UEs position (e.g. reported by a positioning-capable UE), can also calculate the UE's propagation time to the common TA reference point RP which the network also knows for any of its current beams. Then the network can send this propagation time to the UE in connected mode. Still alternatively, the UE can RACH and then receive its differential TA from the RAR. For this RACH, the UE must advance the transmission time of its RACH transmissions by the common TA. So the UE needs to know the value for the common TA before it can derive its differential TA via RACH.

From the UE-specific differential delay $T_{UEx}$ and the common timing adjustment $T_{com}$ a full TA $T_{full}$ is obtained for each UE:

$$T_{full}=T_{com}+T_{UEx}$$

This full TA $T_{full}$ can then be used by the UE to maintain the UL timing advance and synchronization in the NTN cell.

Changing Common TA in a Transparent Payload NTN

In a regenerative payload NTN, the gNB (or its distributed unit gNB-DU) is on the satellite and so, the common TA is essentially the height of the satellite above the reference point. This depends mostly on the orbital height of the satellite and so for a given beam or satellite, this height is to a large extent fixed the implication of which is that the common TA does not significantly change with time. In a transparent payload NTN as shown in FIG. 1, however, the gNB is located on the ground and the common TA depends on both the satellite height and the propagation delay between the satellite and the terrestrial gNB. As the satellite describes its orbit, this second component changes and so the common TA also changes. The embodiments described below in more detail address this aspect of how to treat a changing common TA in a transparent payload NTN that changes because of: (a) the changing distance due to the orbiting of the satellite between the gNB and the satellite or, (b) a feeder link switch. When a feeder link switch occurs, the network switches its connection to the UE from the current serving gateway to another target gateway. The distance between the target gateway and the satellite is likely to be different from that between the original serving gateway and the satellite.

Figure 3A:
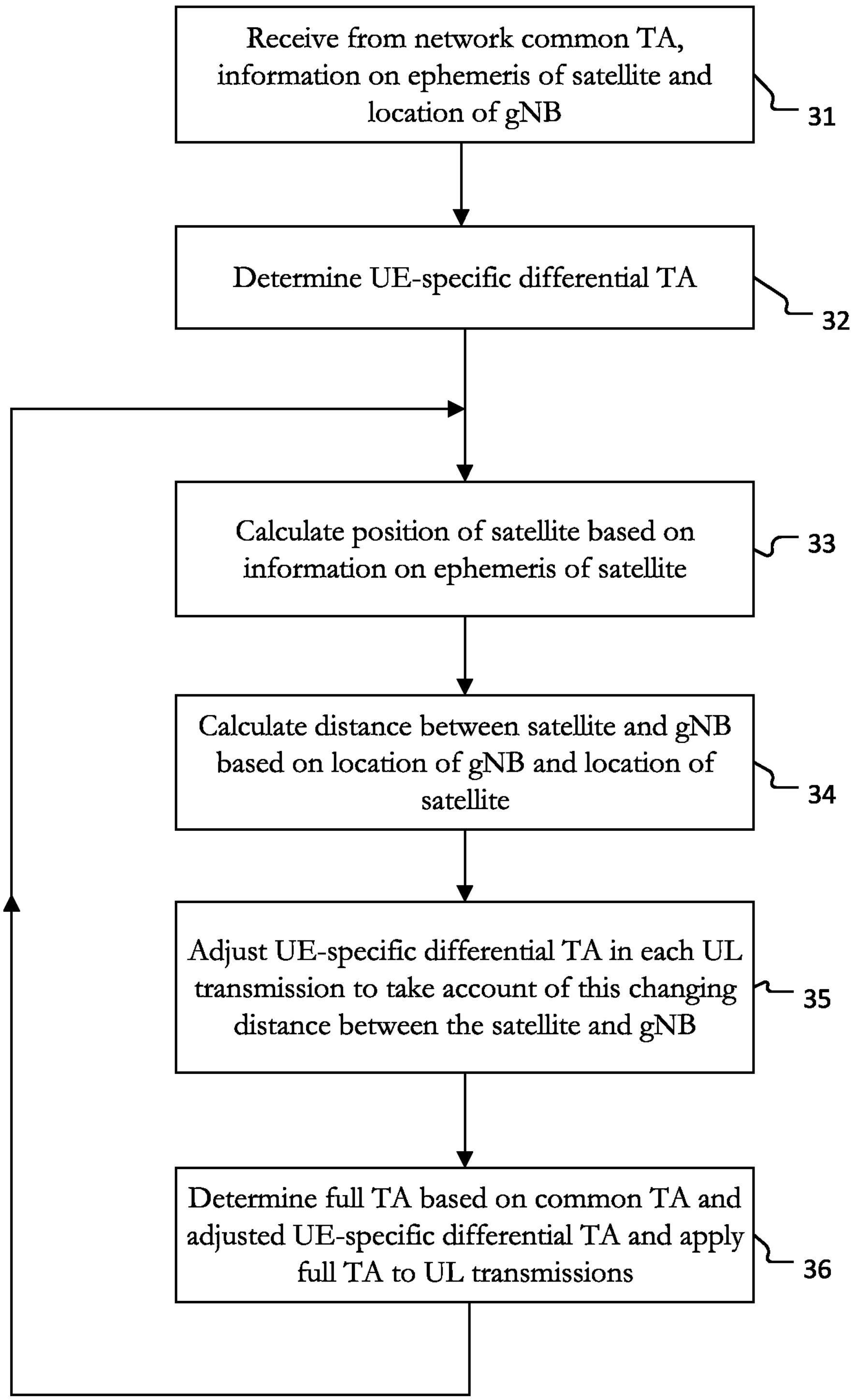
FIG. 3*a* shows a first embodiment of a process compensating a changing common TA at the UE in a transparent payload NTN.

FIG. 3*a* shows a first embodiment of a process compensating a changing common TA at the UE in a transparent payload NTN. At 31, a UE receives from the network a common TA, information on the ephemeris of a satellite, and the location of the serving gNB tethered by the satellite. At 32, the UE determines the UE-specific differential TA. This may happen according to any one of the methods described above (depending on the chosen method of determining the UE-specific differential TA, the network may provide additional information such as the position of the reference point RP, UE-specific propagation time, etc not displayed in FIG. 3*a*). Knowing the ephemeris of the satellite and hence its orbital speed, at 33, the UE calculates the position of the satellite based on the information on the ephemeris of the satellite. This calculation of the position of the satellite based on the information on the ephemeris of the satellite may be performed according to the principles set out in Annex A of 3GPP TR 38.821 V16.0.0 which is herewith incorporated by reference. At 34, the UE calculates the distance between the satellite and its tethered gNB based on the location of the satellite and the location of the gNB. Based on this distance between the satellite and its tethered gNB, the UE, at 35, adjusts its UE-specific differential TA (for example in each UL transmission) to take account of any changes in the distance between the satellite and its tethered gNB. At 36, the UE determines the full TA based on the (constant) common TA obtained from the network, and based on the adjusted UE-specific differential TA. The UE then uses this full TA for maintenance of UL timing advance and synchronization in NTN cell. As indicated by the arrow in FIG. 3*a*, steps 33, 34, 35, and 36 are performed repeatedly while the UE is within the spot beam of the satellite and thus in the service area of the gNB tethered by the satellite.

In this embodiment, the common TA stays constant whilst the changes in the feeder link propagation time are absorbed as part of the UE-specific differential TA. The location of the serving gNB can be provided to the UEs once they enter RRC connected mode and/or shortly after feeder link switching occurs. The location of the serving gNB can for example be provided to the UEs in a MAC signaling e.g. MAC control element (MAC CE). In RRC connected mode, the gNB location information can be encrypted and this information is transferred either in encrypted user plane packet or protected RRC signaling. The ephemeris data may be provided to the UEs according to the principles set out in section 7.3.6.2 of 3GPP TR 38.821 V16.0.0 which are summarized below with regard to FIG. 8 and the corresponding description.

Figure 3B:
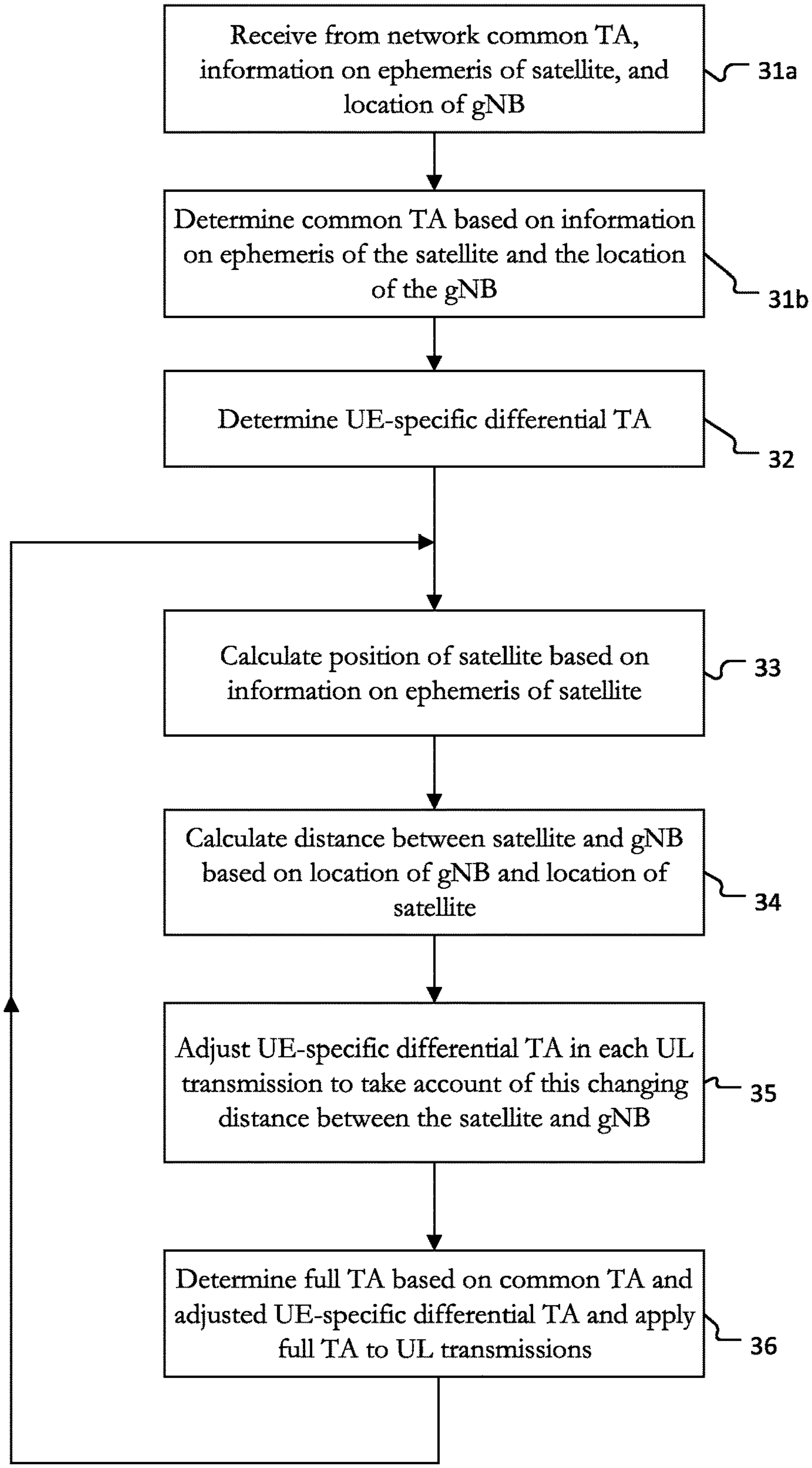
FIG. 3*b* shows a variant of the first embodiment where the UE determined the common TA.

In the embodiment of FIG. 3*a*, the UE receives, at 31, a common TA from the network. FIG. 3*b* shows a variant of this first embodiment. In this variant, the UE does not receive the common TA from the network. Instead, the UE, at 31*a* receives from the network information on the ephemeris of the satellite and the location of the gNB. At 31*b*, the UE determines a common TA based on the information on the ephemeris of the satellite and the location of the gNB, and then follows the same steps 33 to 36 as in the embodiment of FIG. 3*a*.

Figure 4A:
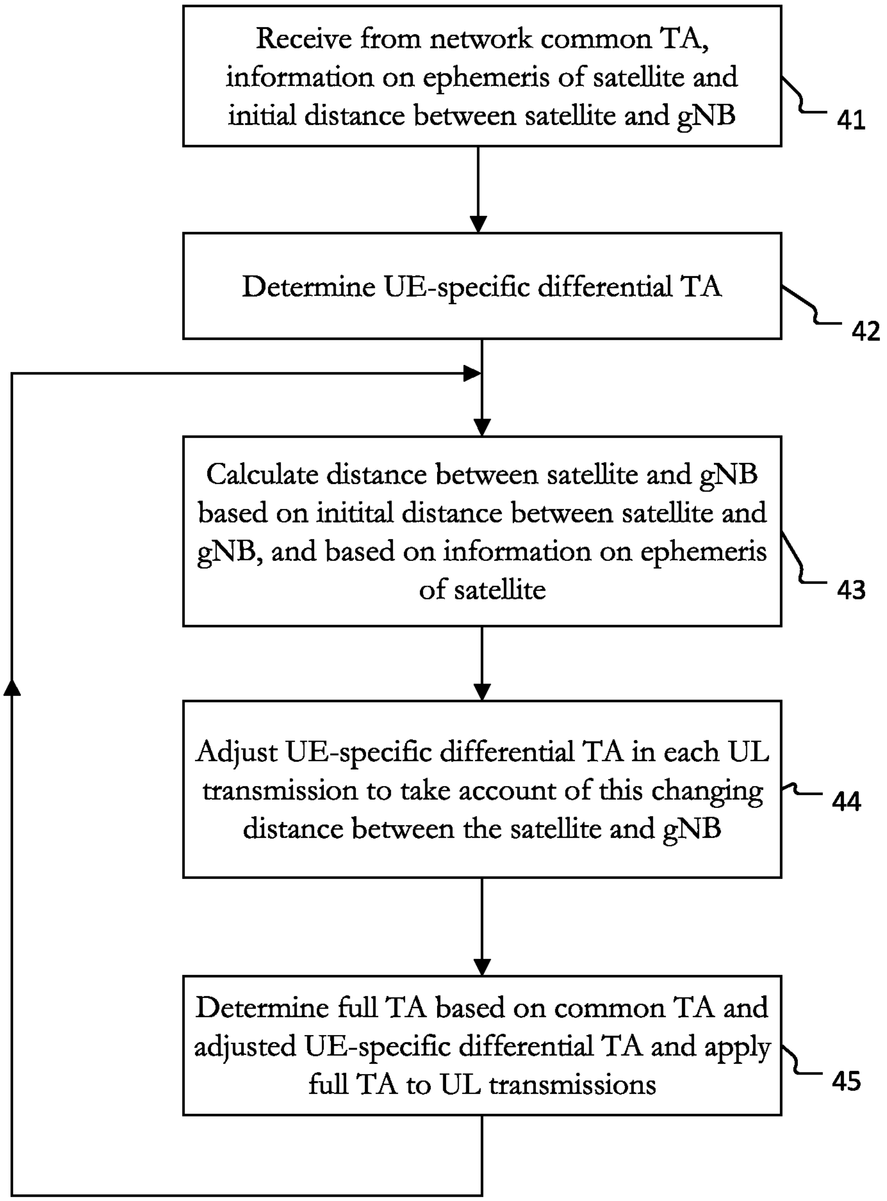
FIG. 4*a* shows a second embodiment of a process compensating a changing common TA in a transparent payload NTN.

FIG. 4*a* shows a second embodiment of a process of compensating a changing common TA in a transparent payload NTN. At 41, a UE receives from the network a common TA, information on the ephemeris of a satellite, and the initial distance between the satellite and the serving gNB tethered by the satellite. At 42, the UE determines the UE-specific differential TA. Knowing the ephemeris of the satellite and hence its orbital speed, at 43, the UE calculates the distance between the satellite and the gNB based on the initial distance between the satellite, and based on the information on the ephemeris of the satellite. Based on this distance between the satellite and its tethered gNB, the UE, at 44, adjust its UE-specific differential TA (for example in each UL transmission) to take account of any changes in the distance between the satellite and its tethered gNB. At 45, the UE determines its full TA based on the (constant) common TA obtained by from the network, and based on the adjusted UE-specific differential TA. The UE then uses this full TA for maintenance of UL timing advance and synchronization in NTN cell. As indicated by the arrow in FIG. 4*a*, steps 43, 44, and 45 are performed repeatedly while the UE is within the spot beam of the satellite and thus in the service area of the gNB tethered by the satellite.

Like in the embodiment of FIG. 3*a*, also in this embodiment of FIG. 4*a*, the common TA stays constant whilst the changes in the feeder link propagation time are absorbed as part of the UE-specific differential TA. The distance of the serving gNB can be provided to the UEs once they enter RRC connected mode and shortly after feeder link switching occurs. The location of the serving gNB can for example be provided to the UEs in a MAC control element (MAC CE). In RRC connected mode, the gNB distance information can be encrypted.

Figure 4B:
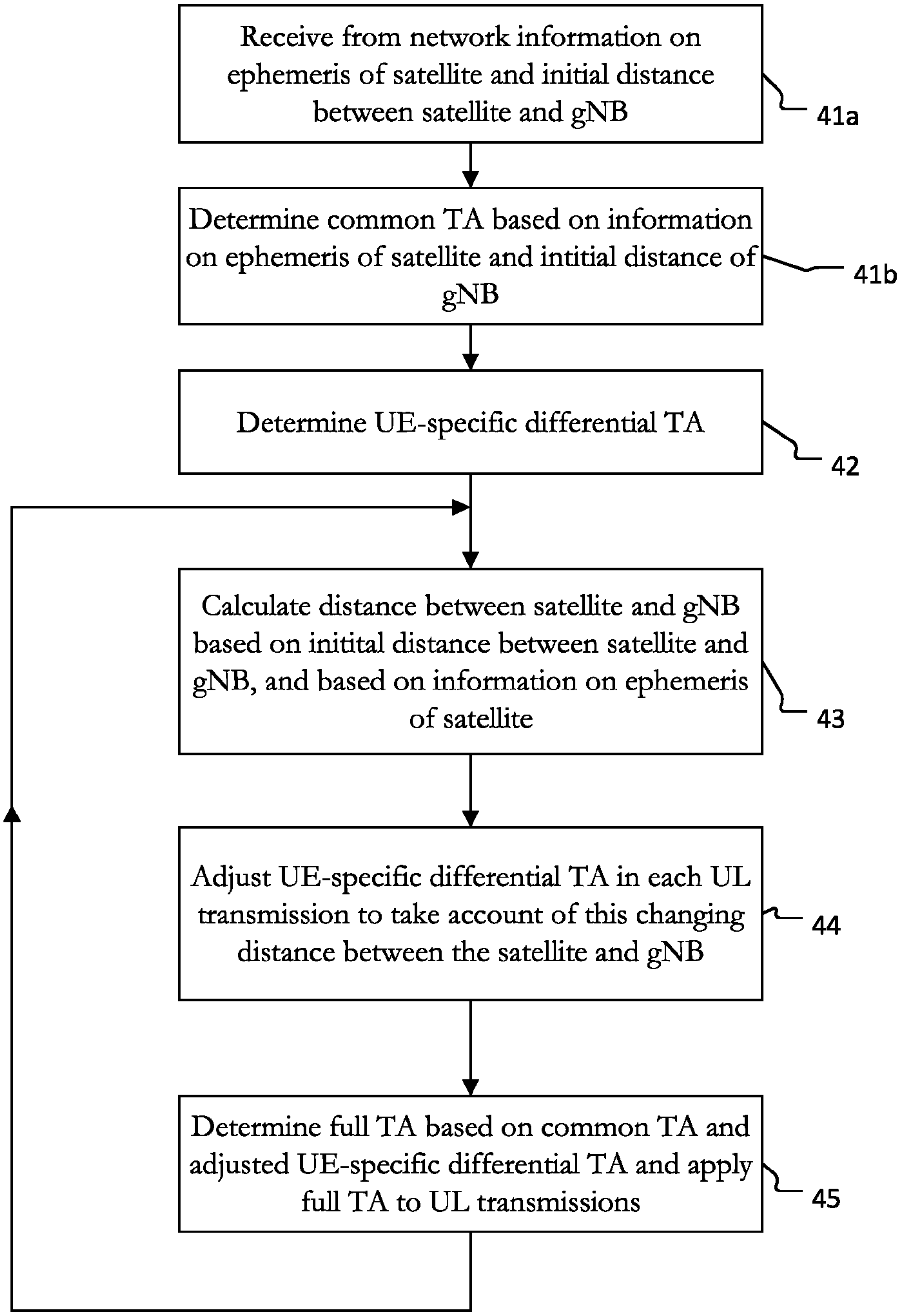
FIG. 4*b* shows a variant of the second embodiment where the UE determined the common TA.

In the embodiment of FIG. 4*a*, the UE receives, at 41, a common TA from the network. FIG. 4*b* shows a variant of this second embodiment. In this variant, the UE does not receive the common TA from the network. Instead, the UE, at 41*a* receives from the network information on the ephemeris of the satellite and the distance of the gNB. At 41*b*, the UE determines a common TA based on the information on the ephemeris of the satellite and the location of the gNB, and then follows the same steps 43 to 45 as in the embodiment of FIG. 4*a*.

Figure 5:
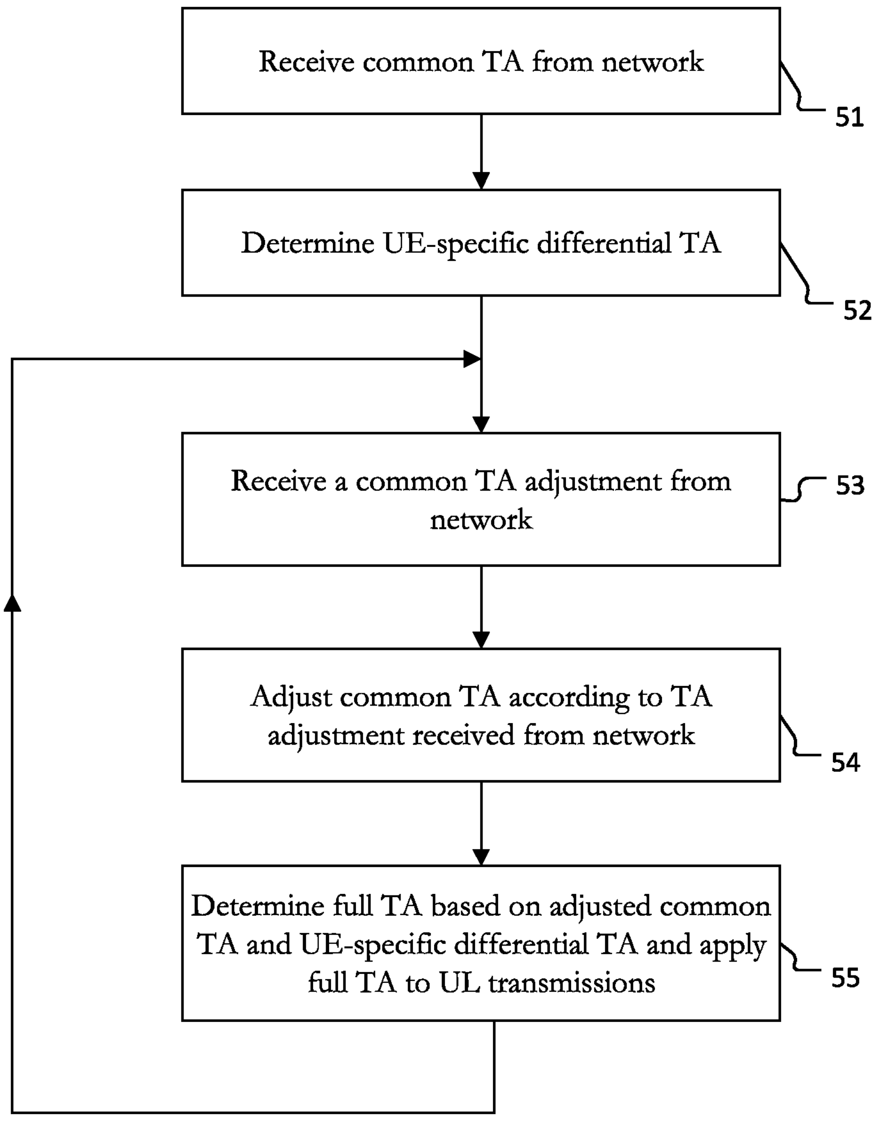
FIG. 5 shows a third embodiment of a process compensating a changing common TA in a transparent payload NTN.

FIG. 5 shows a third embodiment of a process compensating a changing common TA in a transparent payload NTN. At 51, a UE receives from the network a common TA. At 52, the UE determines the UE-specific differential TA. At 53, a UE in connected mode regularly receives common TA adjustment messages. Such a message will carry the common TA adjustment calculated by the network that arises either from just normal orbital movement of the satellite or from feeder link switching. Since this signaling is UE-specific and there are likely many UEs within the large footprint of a particular spot beam, it consumes a lot of resources. At 54, the UE adjusts the common TA based on the common TA adjustment received from the network. At 55, the UE determines its full TA based on the adjusted common TA and based on the UE-specific differential TA. The UE then uses this full TA for maintenance of UL timing advance and synchronization in NTN cell. As indicated by the arrow in FIG. 5, steps 53, 54 and 55 are performed repeatedly while the UE is within the spot beam of the satellite and thus in the service area of the gNB tethered by the satellite.

An adjusted common TA $T_{com,adjusted}$ may for example be determined according to $$T_{com,adjusted} = T_{com} + T_{adjust}$$

based on a constant common TA $T_{com}$ initially received from the network and based on a respective current TA adjustment $T_{adjust}$ repeatedly received from the network.

Figure 6:
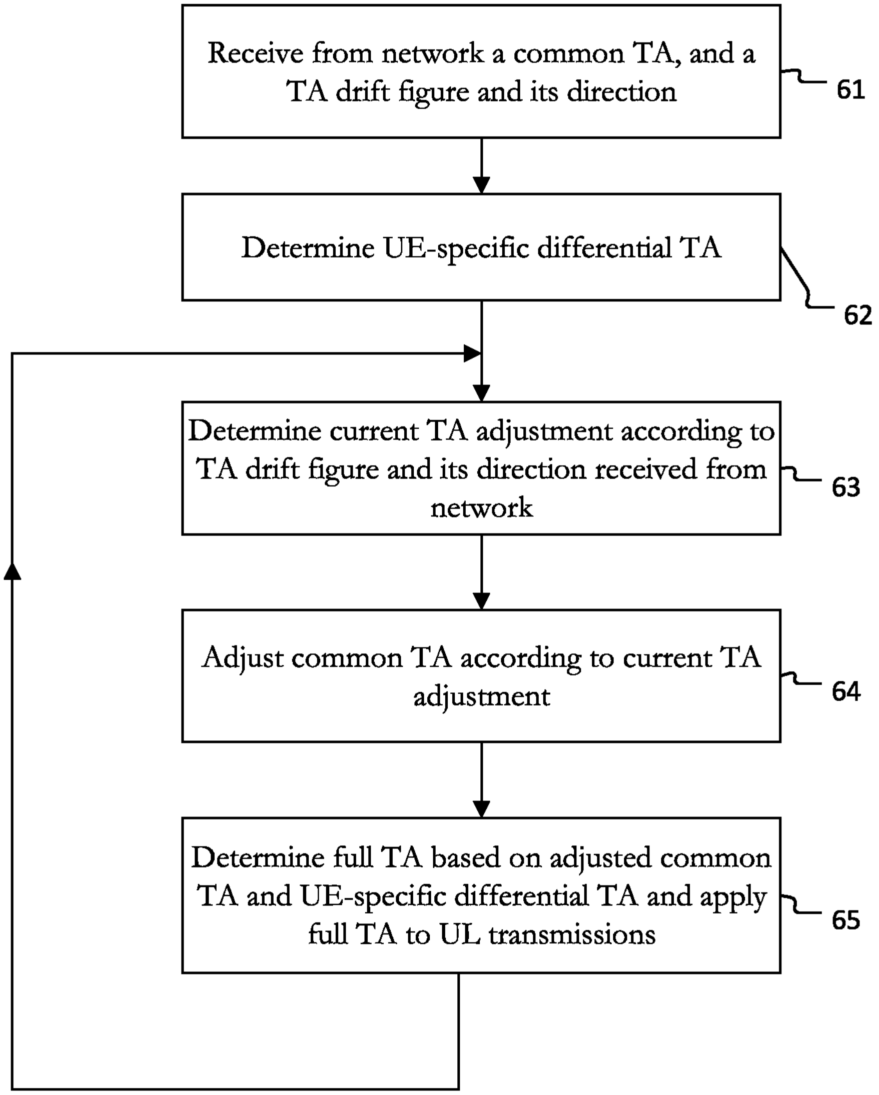
FIG. 6 shows a fourth embodiment of a process compensating a changing common TA in a transparent payload NTN.

FIG. 6 shows a fourth embodiment of a process compensating a changing common TA in a transparent payload NTN. At 61, a UE receives from the network a common TA, a TA drift figure and its direction. The drift figure and the direction of the drift are derived by the network from the satellite ephemeris information. The TA drift includes both the drift due to the satellite movement in its orbit and also its changing displacement from its serving gNB as calculated by the network. The network may for example send the TA drift figure and its direction to the UE as part of the RAR response in msg2 of 4-step RACH or msgB of 2-step RACH or by regular MAC messages. At 62, the UE determines the UE-specific differential TA. At 63, the UE determines a current TA adjustment from the drift figure and direction obtained from the network. At 64, the UE adjusts the common TA according to the current TA adjustment obtained from the drift figure and direction. At 65, the UE determines its full TA based on the adjusted common TA and based on the UE-specific differential TA. The UE then uses this full TA for maintenance of UL timing advance and synchronization in NTN cell. As indicated by the arrow in FIG. 6, steps 63, 64, and 65 are performed repeatedly while the UE is within the spot beam of the satellite and thus in the service area of the gNB tethered by the satellite.

This embodiment works for all types of satellite orbits including elliptical orbits and allows the UEs to have three components in its TA adjustment: common TA, TA drift and UE-specific differential TA. The signaling is UE-specific with regard to the drift figure and direction, but the drift figure and direction may be provided to the UEs less frequent than in the embodiment of FIG. 5. The signaling thus consumes less resources than the signaling in the embodiment of FIG. 5.

In the embodiment of FIG. 6, the UE receives from the network a TA drift figure and its direction In an alternative embodiment, the UE will receive from the network only a TA drift figure and the UE determines the direction of the drift from the ephemeris.

Figure 7:
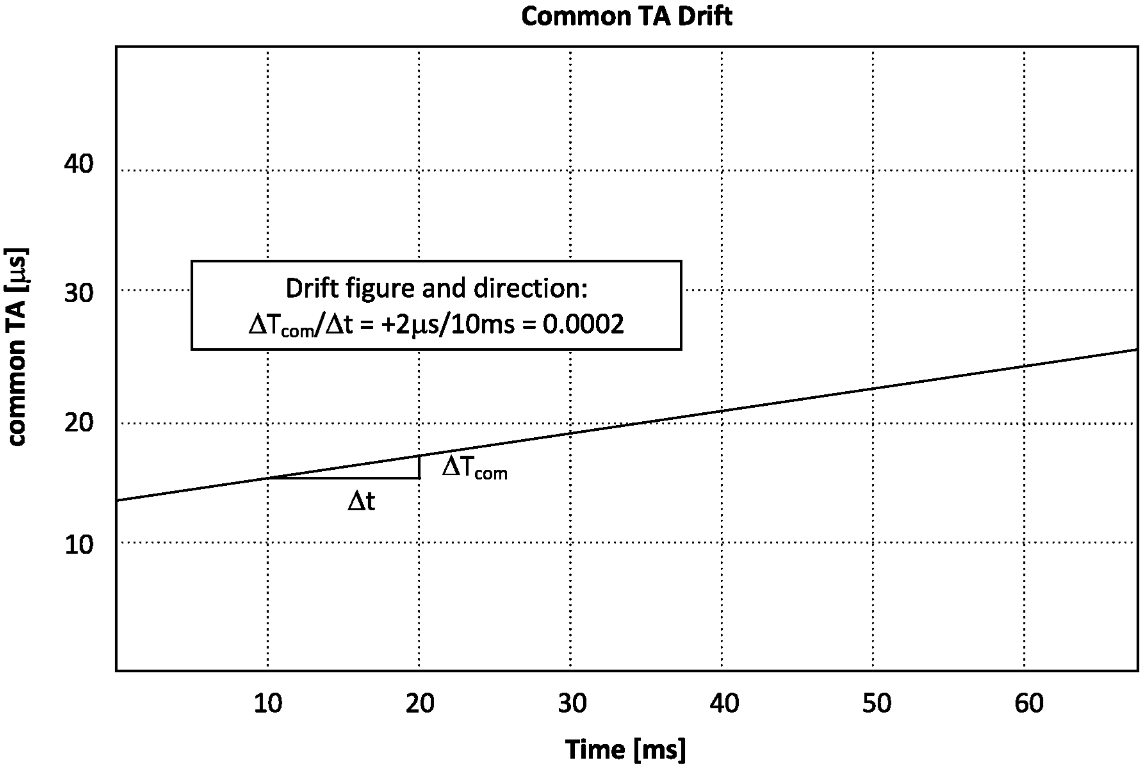
FIG. 7 shows an example of determining a TA adjustment based on a drift figure and direction sent from the network to the UE.

FIG. 7 shows an example of determining a TA adjustment based on a drift figure and direction sent from the network to the UE (or drift direction determined by the UE from the ephemeris) as described at process step 62 in the fourth embodiment above. In the example, a drift figure and direction $\Delta T_{com}/\Delta t$=+2 μs/10 ms=+0.0002, for example, is sent from the network to a UE. The drift FIG. 0.0002 indicates the amount of TA drift, whereas the plus sign indicates the direction of the TA drift (here: TA drift is increasing in time). The graph shows the time in milliseconds (ms) on the ordinate and the common TA in microseconds (μs) on the abscissa. The solid line shows the common TA $T_{com,adjusted}$ as computed by the UE from the drift figure and direction obtained from the network. This adjusted common TA $T_{com,adjusted}$ may for example be determined according to $$T_{com,adjusted} = T_{com} + (\Delta T_{com}/\Delta t) * t$$

based on the time t, drift figure and direction $\Delta T_{com}/\Delta t$ and a predefined fixed common TA $T_{com}$ received from the network.

The embodiments described above all address the issue of feeder link influence on the common TA and thus allow for a maintenance of UL timing advance and synchronization in NTN cells.

Ephemeris Data for NTN

Ephemeris Data for NTN is treated in section 7.3.6 of 3GPP TR 38.821 V16.0.0 in more detail which is herewith incorporated by reference. Ephemeris data may contain the information about the orbital trajectories of artificial satellites as described for example in Annex A of 3GPP TR 38.821 V16.0.0. There are different possible representations of ephemeris data.

Figure 8:
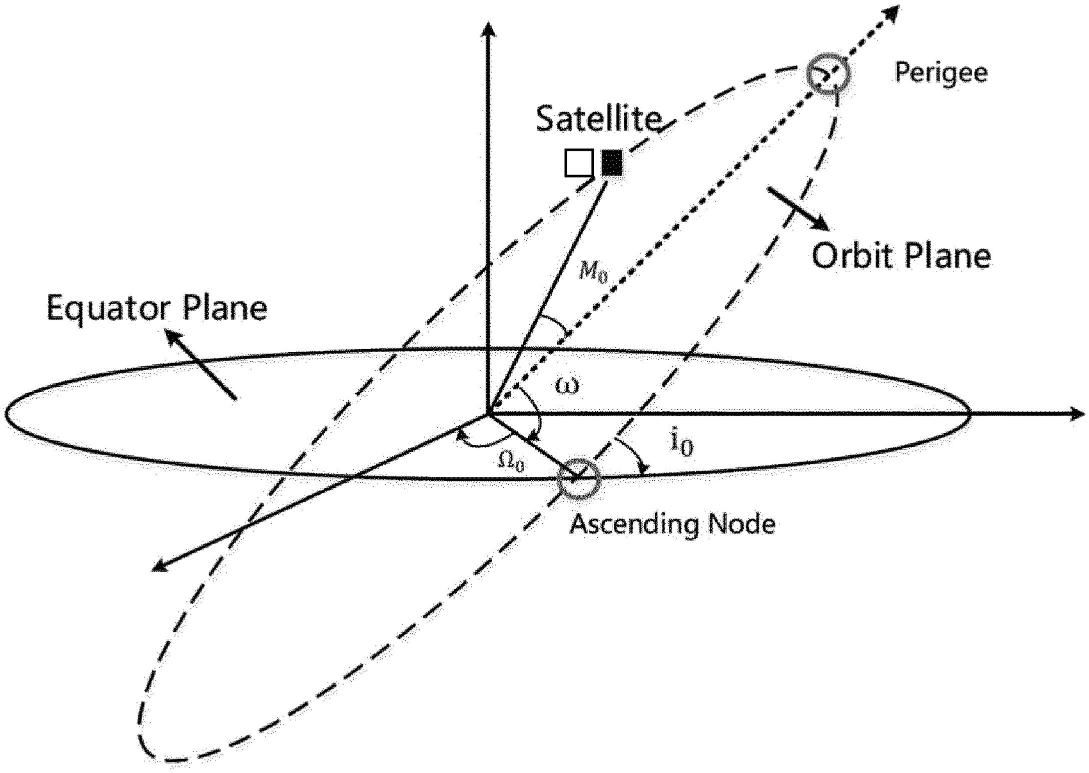
FIG. 8 shows an example of representing ephemeris data.

FIG. 8 shows one possibility to represent ephemeris data. According to this example orbital parameters are used, e.g. semi-major axis α, eccentricity e, inclination $i_0$, right ascension $\Omega_0$ of the ascending node, argument ω of periapsis, mean anomaly $M_0$ at a reference point in time, and the epoch $t_{06}$. The first five parameters can determine an orbital plane, and the other two parameters are used to determine exact satellite location at a time. A description table for the orbital parameters and the corresponding illustrations are as below:

| | | |
|---|---|---|
| Orbital plane parameters | $\sqrt{a}$ | Square root of semi major axis (semi-major axis) |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | ω | Argument of perigee (argument of periapsis) |
| Satellite level parameters | $M_0$ | Mean anomaly at reference time (true anomaly and a reference point in time) |
| | $t_{06}$ | Ephemeris reference time (the epoch) |

The embodiments are, however, not restricted to this representation of ephemeris data. Another possible option is to provide the location of the satellite in coordinates (x, y, z), e.g. ECEF coordinates. Additionally, a velocity vector (vx, vy, vz) and again a reference point in time may also be provided.

The ephemeris data may be provided to the UEs according to the principles set out in section 7.3.6.2 of 3GPP TR 38.821 V16.0.0. A possibility of provisioning the ephemeris data or parts of the ephemeris data from the network to the UE may be via a memory card such as a uSIM. However, there is no need for a UE to store orbital parameters for all the satellites. If the orbital parameters per satellite are pre-provisioned, UE only needs to store the ephemeris data for the satellites that may serve UE. Another possible solution is to broadcast the orbital parameters of the serving satellite and several neighbouring satellites which will be sufficient for initial access and mobility handling at UE side.

Means for updating ephemeris data stored in a UE may be foreseen such as set out in section 7.3.6.3 of 3GPP TR 38.821 V16.0.0 which is herewith incorporated by reference.

Given a specific point in time, it is straightforward to calculate the satellite location according to the principles set out in Annex A of 3GPP TR 38.821 V16.0.0 which is herewith incorporated by reference.

Implementation

Figure 9:
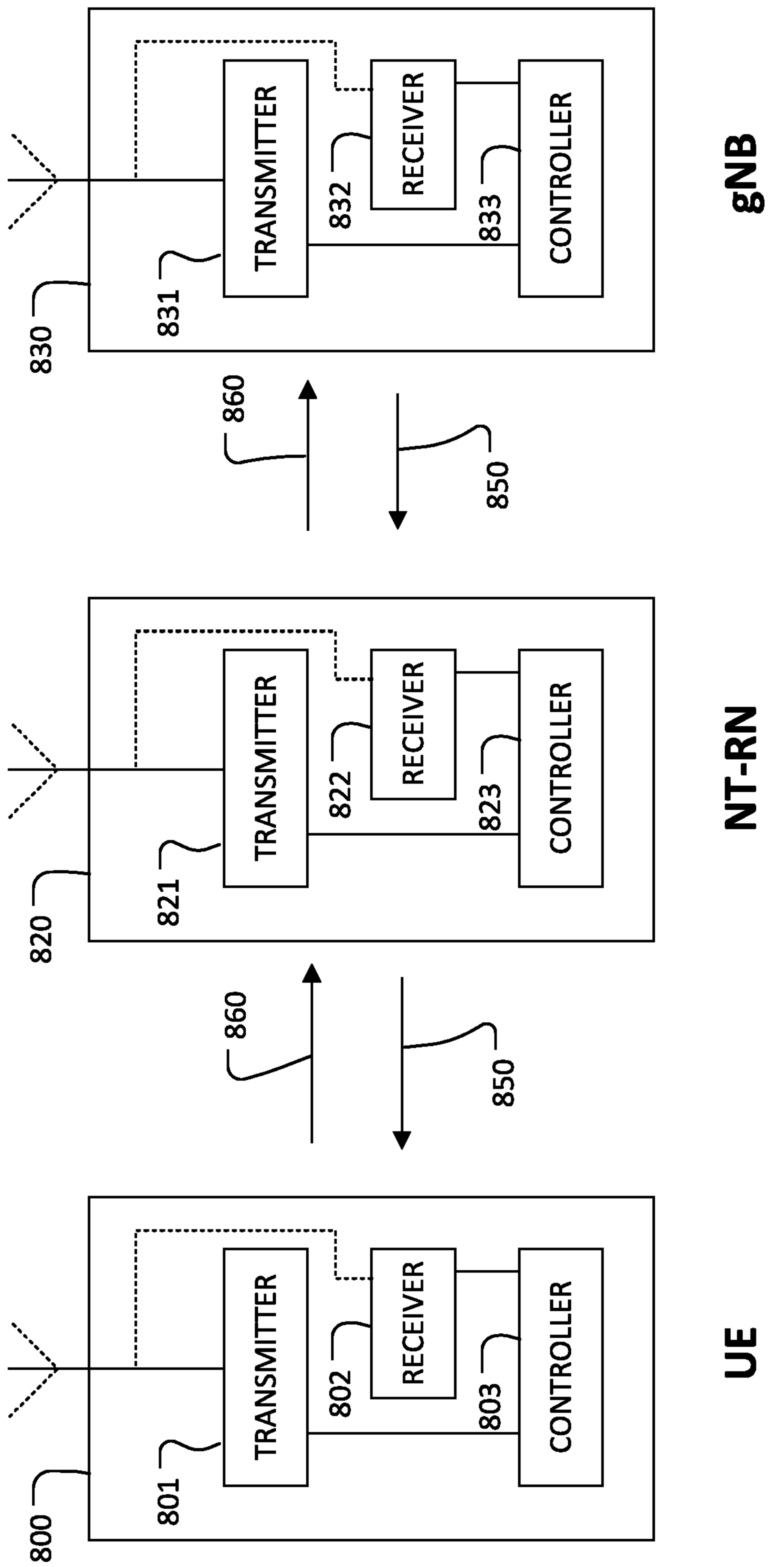
FIG. 9 shows a schematic block diagram of a communications path between an UE and an gNB.

FIG. 9 shows a schematic block diagram of a communications path between a UE 800, a non-terrestrial (space/airborne) relay node NT-RN 820 (e.g. satellite), and a gNB 830. As shown in FIG. 9 the UE includes a transmitter 801, a receiver 802, and a controller 803 to control the transmission of signals to and the reception of signals from the gNB. The Uplink signals are represented by an arrow 860. Downlink signals are shown by an arrow 850. The space/airborne relay node RT-RN 820 includes a transmitter 821 a receiver 822 and a controller 823 which may include functionality for relaying downlink and uplink signals between the UE 800 and the gNB 820 in accordance with a wireless access interface. The gNB 830 includes a transmitter 831 a receiver 832 and a controller 833 which may include a scheduler for scheduling the transmission and reception of signals on the downlink and the uplink in accordance with a wireless access interface.

Figure 10:
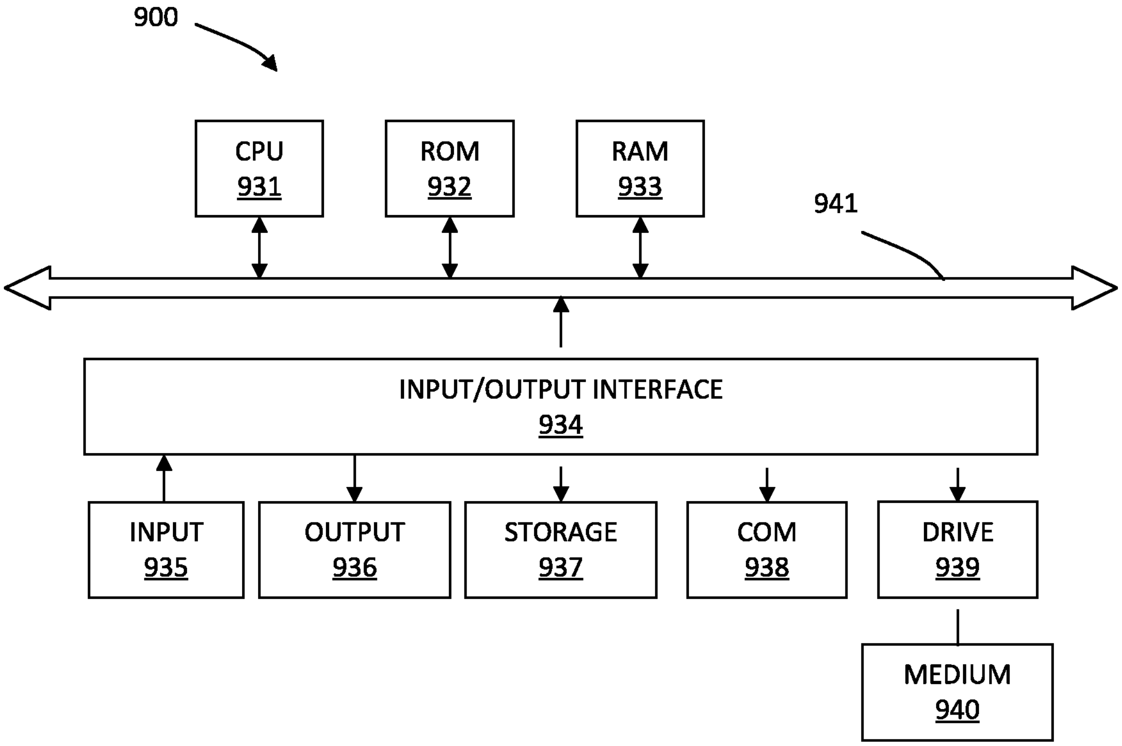
FIG. 10 shows an embodiment of a controller for a UE, a gNB, a relay node or a non-terrestrial network component.

FIG. 10 describes an embodiment of a controller 900. This controller 900 can be implemented such that it can basically function as any type of apparatus or entity, base station, relay node, transmission and reception point, or user equipment as described herein. Controller 900 can thus act as controllers 803, 823, or controller 833 of FIG. 9. The controller 900 has components 931 to 940, which can form a circuitry, such as any one of the circuitries of the entities, base stations, and user equipment, as described herein.

Embodiments which use software, firmware, programs or the like for performing the methods as described herein can be installed on controller 900, which is then configured to be suitable for the concrete embodiment.

The controller 900 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the controller 900 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. The output 936 can have a display (liquid crystal display, cathode ray tube display, light emittance diode display, etc.), loudspeakers, etc. The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc. When the controller 900 functions as a base station, the communication interface 938 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the controller 900 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding. For example the ordering of the process steps 31*b* and 32 in FIG. 3*b* may be changed. Other changes of the ordering of method steps may be apparent to the skilled person.

It should also be noted that the division of the control or circuitry of FIG. 10 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An electronic device (UE) comprising circuitry configured to compensate feeder link influence on the common TA ($T_{com}$) in a transparent payload non-terrestrial network (NTN) configuration with a non-terrestrial network component (NT-RN) and an infrastructure equipment (gNB) tethered by the non-terrestrial network component (NT-RN).

(2) The electronic device (UE) of (1) in which the circuitry is configured to absorb changes in a feeder link propagation time as part of a UE-specific differential TA ($T_{UEx}$).

(3) The electronic device (UE) of (1) or (2) in which the circuitry is configured to repeatedly adjust (35, 44) a UE-specific differential TA ($T_{UEx}$) to take account of a changing distance between the non-terrestrial network component (NT-RN) and the infrastructure equipment (gNB).

(4) The electronic device (UE) of any one of (1) to (3), in which the circuitry is configured to receive (31) information on the ephemeris of the non-terrestrial network component (NT-RN) and a location of the infrastructure equipment (gNB), and to repeatedly calculate (33, 34) a distance between the non-terrestrial network component (NT-RN) and the infrastructure equipment (gNB) based on this information.

(5) The electronic device (UE) of any one of (1) to (4), in which the circuitry is configured to receive (41) information on the ephemeris of the non-terrestrial network component (NT-RN) and an initial distance between the infrastructure equipment (gNB) and the non-terrestrial network component (NT-RN), and to repeatedly calculate (43) a distance between the non-terrestrial network component (NT-RN) and the infrastructure equipment (gNB) based on this information.

(6) The electronic device (UE) of any one of (1) to (5), in which the circuitry is configured to receive (31) information on the location of the infrastructure equipment (gNB) or information on the distance of the infrastructure equipment (gNB) from the non-terrestrial network component (NT-RN) once the electronic device (UE) enters RRC connected mode and/or shortly after feeder link switching occurs.

(7) The electronic device (UE) of any one of (1) to (6), in which the circuitry is configured to receive (31) information on the location of the infrastructure equipment (gNB) or information on the distance of the infrastructure equipment (gNB) from the non-terrestrial network component (NT-RN) in encrypted form.

(8) The electronic device (UE) of any one of (1) to (7), in which the circuitry is configured to repeatedly receive (53) a current TA adjustment ($T_{adjust}$) and to adjust (54) a common TA ($T_{com}$) according to this TA adjustment ($T_{adjust}$).

(9) The electronic device (UE) of any one of (1) to (8), in which the circuitry is configured to repeatedly determine (63) a current TA adjustment (($\Delta T_{com}/\Delta t$)*$t$) according to a TA drift figure and its direction ($\Delta T_{com}/\Delta t$) and to adjust (64) a common TA ($T_{com}$) according to this TA adjustment ($T_{adjust}$).

(10) The electronic device (UE) of (9), in which the TA drift figure and its direction ($\Delta T_{com}/\Delta t$) includes both the drift due to the satellite movement in its orbit and also its changing displacement from the tethered infrastructure equipment (gNB).

(11) The electronic device (UE) of (9) or (10), in which the circuitry is configured to receive the TA drift figure and its direction ($\Delta T_{com}/\Delta t$) as part of the RAR response in msg2 of 4-step RACH or msgB of 2-step RACH or by regular MAC messages.

(12) A system comprising an electronic device (UE) as defined in any one of (1) to 12, an infrastructure equipment (gNB) located on the ground, and a non-terrestrial network component (NT-RN) configured to relay uplink and downlink traffic between the user equipment (UE) and the infrastructure equipment (gNB).

(13) An infrastructure equipment (gNB; NTC) comprising circuitry configured to provide information to a user equipment (UE) for compensating feeder link influence on the common TA ($T_{com}$) in a transparent payload non-terrestrial network (NTN) configuration with a non-terrestrial network component (NT-RN) and a base station (gNB) tethered by the non-terrestrial network component (NT-RN).

(14) The infrastructure equipment (gNB; NTC) of (13) in which the circuitry is configured to send to the user equipment (UE) information on the ephemeris of the non-terrestrial network component (NT-RN).

(15) The infrastructure equipment (gNB; NTC) of (13) or (14) in which the circuitry is configured to send to the user equipment (UE) information on the location of the infrastructure equipment (gNB) tethered by the non-terrestrial network component (NT-RN).

(16) The infrastructure equipment (gNB; NTC) of any one of (13) to (15) in which the circuitry is configured to send to the user equipment (UE) information on an initial distance between the infrastructure equipment (gNB) and the non-terrestrial network component (NT-RN).

(17) The infrastructure equipment (gNB; NTC) of any one of (13) to (16) in which the circuitry is configured to send to the user equipment (UE) information on the location of the infrastructure equipment (gNB) or information on the distance of the infrastructure equipment (gNB) from the non-terrestrial network component (NT-RN) once the electronic device (UE) enters RRC connected mode and/or shortly after feeder link switching occurs.

(18) The infrastructure equipment (gNB; NTC) of any one of (13) to (17) in which the circuitry is configured to send to the user equipment (UE) information on the location of the infrastructure equipment (gNB) or information on the distance of the infrastructure equipment (gNB) from the non-terrestrial network component (NT-RN) in encrypted form.

(19) The infrastructure equipment (gNB; NTC) of any one of (13) to (18) in which the circuitry is configured to repeatedly send to the user equipment (UE) a current TA adjustment ($T_{adjust}$).

(20) The infrastructure equipment (gNB; NTC) of any one of (13) to (19) in which the circuitry is configured to send to the user equipment (UE) a TA drift figure, or a TA drift figure and its direction ($\Delta T_{com}/\Delta t$).

(21) The infrastructure equipment (gNB; NTC) of (20) in which the circuitry is configured to send the TA drift figure and its direction ($\Delta T_{com}/\Delta t$) as part of the RAR response in msg2 of 4-step RACH or msgB of 2-step RACH or by regular MAC messages.

(22) A method comprising compensating feeder link influence on the common TA ($T_{com}$) in a transparent payload non-terrestrial network (NTN) configuration with a non-terrestrial network component (NT-RN) and an infrastructure equipment (gNB) tethered by the non-terrestrial network component (NT-RN).

The invention claimed is:

1. A user equipment comprising:

circuitry configured to:

compensate feeder link influence on a common TA in a transparent payload non-terrestrial network configuration with a non-terrestrial network component and an infrastructure equipment tethered by the non-terrestrial network component, the compensating including:

receiving a TA drift figure and its direction from the infrastructure equipment as a part of a Random Access Response, RAR, in msg2 of 4-step RACH or msgB of 2-step RACH, wherein the TA drift figure and its direction represent a changing propagation delay on the feeder link;

repeatedly determining a current TA adjustment based on the TA drift figure and its direction; and adjusting the common TA according to the current TA adjustment.

2. The user equipment of claim 1, wherein the circuitry is configured to absorb changes in a feeder link propagation time as part of a UE-specific differential TA.

3. The user equipment of claim 1, wherein the circuitry is configured to repeatedly adjust a UE-specific differential TA to take account of a changing distance between the non-terrestrial network component and the infrastructure equipment.

4. The user equipment of claim 1, wherein the circuitry is configured to:

receive information on ephemeris of the non-terrestrial network component and a location of the infrastructure equipment, and repeatedly calculate a distance between the non-terrestrial network component and the infrastructure equipment based on the information.

5. The user equipment of claim 1, wherein the circuitry is configured to:

receive information on ephemeris of the non-terrestrial network component and an initial distance between the infrastructure equipment and the non-terrestrial network component, and repeatedly calculate a distance between the non-terrestrial network component and the infrastructure equipment based on this information.

6. The user equipment of claim 1, wherein the circuitry is configured to receive information on a location of the infrastructure equipment or information on a distance of the infrastructure equipment from the non-terrestrial network component once the user equipment enters RRC connected mode and/or shortly after feeder link switching occurs.

7. The user equipment of claim 1, wherein the circuitry is configured to receive information on a location of the infrastructure equipment or information on a distance of the infrastructure equipment from the non-terrestrial network component in encrypted form.

8. The user equipment of claim 1, wherein the TA drift figure and its direction includes both a drift due to movement of the non-terrestrial network component in its orbit and also its changing displacement from the tethered infrastructure equipment.

9. An infrastructure equipment comprising:

circuitry configured to:

provide information to a user equipment for compensating feeder link influence on a common TA in a transparent payload non-terrestrial network configuration with a non-terrestrial network component and an infrastructure equipment tethered by the non-terrestrial network component, wherein the information includes at least a TA drift figure and its direction that represent a changing propagation delay on the feeder link, and the TA drift figure and its direction that represents the changing propagation delay on the feeder link are provided as a part of Random Access Response, RAR, in msg2 of 4-step RACH or msgB of 2-step RACH.

10. The infrastructure equipment of claim 9, wherein the information includes ephemeris of the non-terrestrial network component.

11. The infrastructure equipment of claim 9, wherein the information includes the location of the infrastructure equipment tethered by the non-terrestrial network component.

12. The infrastructure equipment of claim 9, wherein the information includes an initial distance between the infrastructure equipment and the non-terrestrial network component.

13. The infrastructure equipment of claim 9, wherein the circuitry is configured to send the information in encrypted form.

14. A method comprising:

compensating, by a user equipment, feeder link influence on a common TA in a transparent payload non-terrestrial network configuration with a non-terrestrial network component and an infrastructure equipment tethered by the non-terrestrial network component, the compensating including:

receiving a TA drift figure and its direction from the infrastructure equipment as a part of a Random Access Response, RAR, in msg2 of 4-step RACH or msgB of 2-step RACH, wherein the TA drift figure and its direction represent a changing propagation delay on the feeder link;

repeatedly determining a current TA adjustment based on the TA drift figure and its direction; and adjusting the common TA according to the current TA adjustment.

* * * * *